April 23, 1968  H. C. MASON  3,379,227

SAW APPARATUS

Filed Feb. 8, 1966

Howard C. Mason
INVENTOR

BY Kolisch & Hartwell

Attys.

United States Patent Office 3,379,227
Patented Apr. 23, 1968

3,379,227
SAW APPARATUS
Howard C. Mason, Rte. 2, Box 810,
Oregon City, Oreg. 97045
Filed Feb. 8, 1966, Ser. No. 525,964
9 Claims. (Cl. 143—47)

ABSTRACT OF THE DISCLOSURE

Saw apparatus including a support for supporting an elongated workpiece, a pair of upright guide posts on opposite sides of the support extending thereabove, a pair of rigidly interconnected carriages mounted for up and down movement on the posts, and a pair of power-driven saw arbors, which parallel one another and a workpiece supported on the support, with such arbors mounted on the carriages and carrying saw blades. The saw blades occupy substantially a common vertical plane which is normal both to the rotational axes of the arbors and to the longitudinal axis of the workpiece on the support.

This invention relates to saw apparatus, and more particularly to saw apparatus for crosscutting a log or like elongated workpiece.

Typically, such apparatus is used in a sawmill to crosscut logs to selected lengths. The logs to be cut sometimes differ quite substantially in diameter from one log to the next, and thus it is desirable to employ apparatus which will adequately handle all sizes of logs which are expected. Additionally, for economical operation, it is preferable to use equipment wherein crosscutting may be accomplished in a single cutting pass through a log.

Known apparatus of the type described comprises a single rotary saw blade mounted on one end of a pivoted arm, whereby on swinging of the arm the blade may be swung into the log which is to be cut. Such an arrangement, however, has resulted in a number of problems. Where a single saw blade is used, the blade tends to cause rotation of the log during cutting, and such rotation in turn causes undesirable binding between the blade and the log. To avoid this problem it has been usual to provide some form of stabilizing means which is attached to a log prior to cutting, and which holds it immobile during cutting. Such structure, however, results in additional expense in the equipment and in delay during cutting, since time must be spent in setting up the stabilizing structure. Another problem arises from the use of the pivoted arm to mount the saw blade. With such a construction, it is usually necessary to counterbalance the arm, typically with counterweights mounted on the end of the arm opposite the end where the saw blade is mounted usually. A further problem is that where extremely large-diameter logs must be cut, available saw blades often are not large enough to produce a complete cut in a single cutting pass.

Thus, a general object of the invention is to provide novel saw apparatus for crosscutting a log or like workpiece which avoids the problems encountered with known equipment.

More particularly, an object of the invention is to provide such apparatus wherein, during crosscutting of a workpiece, rotation thereof is automatically inhibited without the need for special stabilizing structure to hold the workpiece.

A related object is to provide such apparatus which employs a pair of rotary saw blades operating simultaneously to cut the workpiece, with the blades rotating in opposite directions, whereby during cutting the blades exert little, if any, net torque on the workpiece. To accomplish this object, the invention features a pair of novel, parallel, laterally spaced saw arbors to mount saw blades, which arbors are power-driven in opposite directions, and are movable simultaneously toward the workpiece in a cutting pass, with the arbors moving toward laterally opposite sides of the workpiece.

Another object of the invention is to provide saw apparatus of the type described wherein two rotary saw blades are employed, one fastened on each arbor, which blades operate in substantially the same plane, and during cutting of a workpiece, are moved simultaneously vertically down through the workpiece along paths extending transversely of the longitudinal axis of the workpiece, with each saw blade producing approximately one-half of the cutting. According to the invention, with the saw blades mounted in operative positions on the arbors, the blades have overlapping peripheral edges, viewing them in the direction that the arbors are moved toward the workpiece, whereby the blades produce a continuous kerf in the workpiece during cutting. An advantage which results from this organization is that even extremely large-diameter workpieces may be cut in a single cutting pass with saw blades of only ordinary size.

These and other objects and advantages are attained by the invention, and the same is described hereinbelow in conjunction with the accompanying drawings, wherein.

Figure 1:
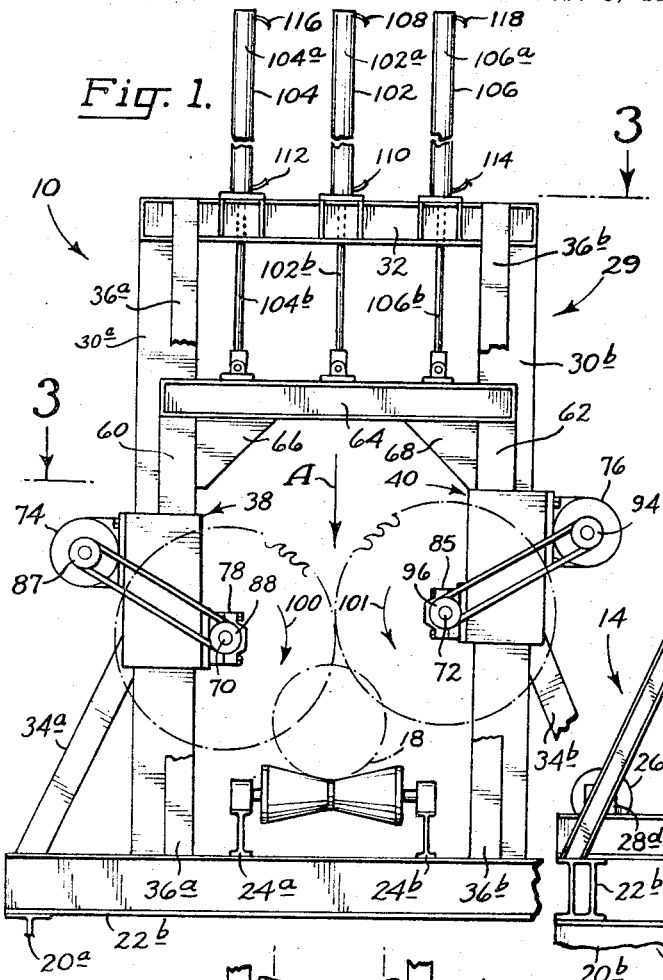
FIG. 1 is an elevation of saw apparatus as contemplated herein.
Figure 2:
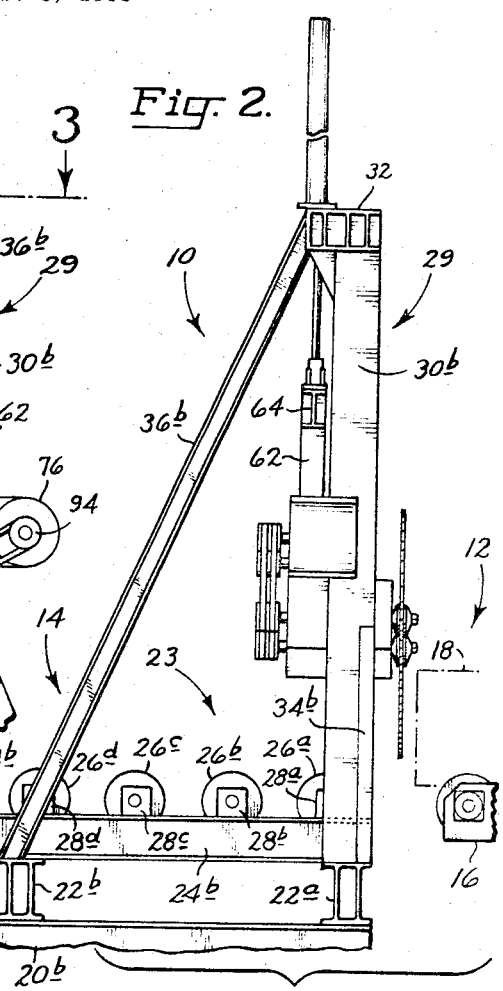
FIG. 2 is a view taken from the right in FIG. 1.
Figure 3:
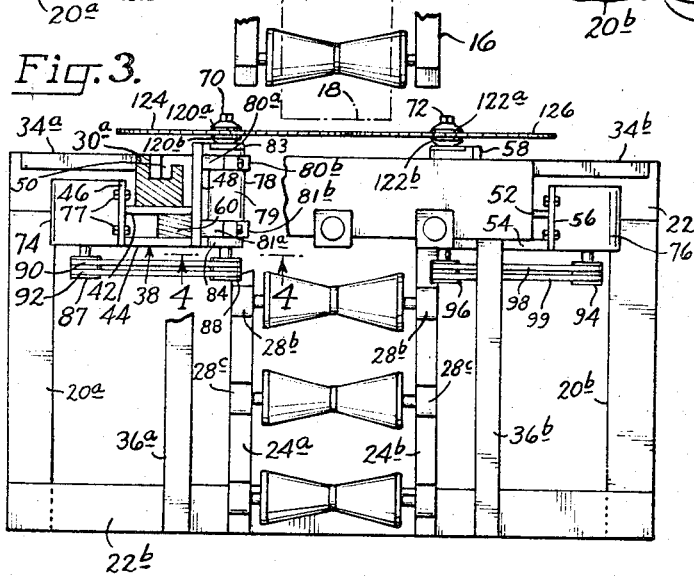
FIG. 3 is a cross sectional view, taken along the line 3—3 in FIG. 1.

Turning now to the drawings, and referring first to FIGS. 1, 2 and 3, saw apparatus as contemplated herein is shown generally at 10, including an infeed end 12 and an offbearing end 14. Disposed in front of infeed end 12, is the offbearing end of a suitable conveyer 16 which is adapted to transport and feed an elongated workpiece, such as log 18 indicated in dashed outline, longitudinally into the apparatus.

The saw apparatus shown comprises a base frame including longitudinal frame members 20a, 20b which extend from the infeed to the discharge ends of the apparatus, and cross frame members 22a, 22b which are welded on top of the longitudinal members and extend transversely across the apparatus. Mounted on the base frame, and extending in a direction longitudinally through the apparatus, is support means indicated generally at 23 for supporting a workpiece which is fed into the apparatus. The support means includes a pair of laterally spaced conveyor support beams 24a, 24b which are joined as by welding to the top of cross frame members 22a, 22b, and conveyor rolls mounted on top of beams 24a, 24b, indicated at 26a to 26d. These conveyor rolls are journaled adjacent their opposite ends in pairs of bearings, such as bearings 28a to 28d, which are suitably fastened on the support beams at points distributed along the lengths thereof.

The conveyor rolls are cradling rolls, and each is shaped in the form of a pair of truncated cones which have been joined together at their small diameter ends. Thus, each roll has a reduced diameter midway between its ends. With such construction, the rolls cradle and inhibit lateral movement of a workpiece supported thereon. Additionally, the rolls function as a conveyor for transporting a workpiece longitudinally through the apparatus.

The apparatus further comprises upright guide structure 29 mounted on the base frame adjacent the infeed end of the apparatus. Such guide structure includes a pair of upright laterally spaced guide posts 30a, 30b which are welded on top of cross frame member 22a, and a cross beam 32 which is suitably fastened to the tops of the two posts. The posts are positioned on top of cross frame member 22a in such a manner that post 30a has substantially the same lateral spacing outwardly from conveyor support beam 24a as post 30b has from conveyor support beam 24b. The guide structure is braced in its upright position on the frame by means of side braces 34a, 34b, which are suitably connected as shown between posts 30a, 30b and cross frame member 22a, and rear braces 36a, 36b, which are suitably connected from cross beam 32 to cross frame member 22b.

Slidably mounted on guide posts 30a, 30b are carriages 38, 40, respectively, which are similar in construction. With reference for a moment to FIG. 3 wherein carriage 38 is illustrated in detail, the carriage may comprise a bearing plate 42 which fits against one surface of guide post 30a as shown, and a facing plate 44 which is parallel to, and spaced somewhat apart from, the bearing plate. Welded to laterally opposite edges of these plates are a pair of side plates 46, 48. The carriage further comprises a bearing shoe 50 which is suitably fastened to bearing plate 42, and which fits around post 30a as shown. With plate 42 and shoe 50 fitted against the guide post, the carriage is adapted to slide up and down freely on the post. The construction specifically described is only exemplary of one of many that might be employed.

Carriage 40 (only a portion of which can be seen in FIG. 3) includes plates 52, 54 which correspond to plates 42, 44 in carriage 38, and plates 56, 58 which correspond to plates 46, 48. Carriage 40 also includes a bearing shoe which is not illustrated.

The carriages are interconnected for simultaneous movement on the guide posts by structure including upright elongated arms 60, 62 which have their lower ends welded between the bearing and facing plates in carriages 38, 40, respectively, a cross member 64 which is welded to the tops of the two arms, and gussets 66, 68 which are welded between the arms and cross member as shown. On vertical movement of cross member 64, by means which will later be described, the two carriages are moved simultaneously on the guide posts.

Mounted on each of the carriages is a saw arbor and an electric motor for driving the arbor. The arbors are indicated at 70, 72, and the motors at 74, 76, for carriages 38, 40, respectively.

Figure 4:
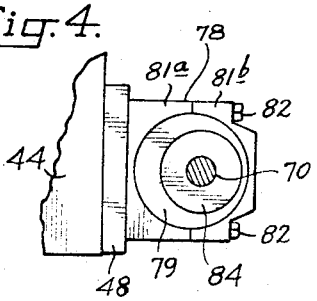
FIG. 4 is an enlarged cross sectional view taken along the line 4—4 in FIG. 3.

Considering the mounting for the motor and arbor on carriage 38, and with particular reference to FIGS. 3 and 4, motor 74 is fastened by nut and bolt assemblies 77 to side plate 46. Arbor 70 is carried in an arbor mount 78 which comprises an elongated hollow cylindrical eccentric member 79, and pairs of split collars 80a, 80b, 81a, 81b. The pairs of collars fit snugly around the eccentric member and are fastened to side plate 48 by nut and bolt assemblies 82 shown in FIG. 4. When these nut and bolt assemblies are tightened, the collars clamp the eccentric member firmly in place, but when they are loosened, the eccentric member is free to rotate in the collars. The arbor is journaled in bearings 83, 84 which are suitably mounted in opposite end of the eccentric member, with the longitudinal axis of the arbor being parallel to, and somewhat offset from, the longitudinal axis of the eccentric member. Motor 76 and arbor 72 are mounted in a similar manner on carriage 40, with arbor 72 being carried in an arbor mount 85 (seen in FIG. 1) which corresponds to arbor mount 78 just described. The arbor mounts, carriages and guide structure together comprise what is referred to herein as mounting means for the arbors.

The two saw arbors substantially parallel one another, and, as can be seen clearly in FIG. 1, are positioned one above the other, with arbor 72 being somewhat higher than arbor 70.

Considering now the driving connections between the motors and arbors, motor 74 is connected to arbor 70 through pulleys, such as multiple belt pulleys 87, 88 which are suitably fastened on the drive shaft of the motor and on one end of the arbor, respectively, and drive belts 90, 92 which are trained over these pulleys. Similarly, motor 76 is connected to arbor 72 through pulleys 94, 96 which correspond to pulleys 87, 88 respectively, and drive belts 98, 99 which correspond to drive belts 90, 92, respectively. The motors are adapted to drive the arbors in opposite directions, such directions being indicated in FIG. 1 by arrows 100, 101.

The saw apparatus further includes means for controlling vertical movement of the two carriages on the guide posts, and in the embodiment illustrated, such means comprises a power-operated double-acting ram 102 for moving the carriages in a downward direction, and a pair of double-acting air-operated rams 104, 106 for biasing the carriages to elevated positions with cross member 64 adjacent beam 32.

Ram 102 includes an elongated cylinder portion 102a which is suitably fastened in an upright position on top of cross beam 32 approximately midway between the ends of the beam, and a rod portion 102b which extends through the bottom end of the cylinder portion, and through an appropriate opening which is provided in the cross beam. The lower end of rod portion 102b is suitably fastened to the top of cross member 64 in the structure interconnecting the two carriages. Cylinder portion 102a of the ram is connected through conduits 108, 110 to a source of hydraulic fluid under pressure (not illustrated).

Rams 104, 106 include elongated cylinder portions 104a, 106a, respectively, which are suitably fastened in upright positions at laterally opposite sides of ram 102 on top of cross beam 32. The rams also include elongated rod portions 104b, 106b which extend through the bottom ends of the cylinder portions in the rams and through suitable openings in beam 32. The lower ends of these rod portions are suitably fastened to the top of cross member 64 as shown. Cylinder portions 104a, 106a are connected by conduits 112, 114, respectively, to a source of air under pressure (not illustrated), and are vented to the atmosphere through conduits 116, 118, respectively.

Considering now the mounting for saw blades in the apparatus, and with reference to FIGS. 1 and 3 together, fastened on arbors 70, 72 by pairs of collars, such as collars 120a, 120b on arbor 70 and collars 122a, 122b on arbor 72, are rotary saw blades 124, 126, respectively. These saw blades have substantially the same diameter, and are positioned on the arbors in such a manner that they lie in substantially a common plane, as can be seen in FIG. 3. Additionally, the saw blades have their peripheral edges closely adjacent one another, and this adjacency, together with the vertical spacing between the arbors, results in the edges overlapping when viewed in the direction that the arbors are moved on vertical movement of the carriages, namely, in the direction indicated by arrow A in FIG. 1. This overlapping exists in a region directly overlying the longitudinal center line of the conveyor rolls.

Considering now how the saw apparatus described operates, air under pressure introduced into rams 104, 106 through conduits 112, 114 exerts an upward bias on cross member 64, tending to hold the carriages, arbors and saw blades in an elevated position with cross member 64 adjacent beam 32. A log to be cut is then fed longitudinally into the infeed end of the saw apparatus from conveyor 16 onto conveyor rolls 26a to 26d, and is stopped when the desired length thereof has traveled past the saw blades. With motors 74, 76 operating, hydraulic fluid under pressure is introduced through conduit 108 into ram 102 to expand the ram. On expansion of ram 102, cross member 64 moves down against the upward bias exerted by rams 104, 106. This results in the saw blades moving a cutting pass into and through the log, with the arbors moving toward laterally opposite sides of the log. When the saw blades engage the log, they cooperate to produce cutting, and as a result of their overlapping peripheral edges, explained above, the blades cut a continuous kerf through the log in a single cutting pass. Since the blades are rotating in opposite directions, the torque which one blade exerts on the log is substantially cancelled by the torque which the other blade exerts. Thus, rotation of the log during cutting is automatically inhibited.

A cutting pass is completed on the saw blades moving entirely through the log. Ram 102 may then be contracted by introducing fluid under pressure through conduit 110 to the base of the ram. This results in lifting of the carriages, arbors, and saw blades to their original elevation. Such lifting is assisted by the upward biasing action of rams 104, 106. The cut portion of the log may then be removed from the saw apparatus in any convenient manner, and the remaining portion of the log, or a new log, fed into the apparatus for another cut.

If it is desired to adjust the spacing between the edges of the saw blades, this may be accomplished simply by freeing the eccentric members in their supporting collars, and rotating the members thus to shift the relative positions of the arbors. Such an adjustment may be required after sharpening of the blades.

Thus, the saw apparatus contemplated herein is adapted to cut a log, or other like workpiece, in a single cutting pass without producing rotation of the log, and without requiring special clamping of the log. Moreover, the apparatus avoids the difficulties encountered in known equipment having a saw blade mounted on a pivoted arm. Furthermore, since two saw blades are used, the range of workpiece diameters which can be handled is considerably greater than the range which can be handled where only a single saw blade is used.

A safety advantage attained by the invention is that accidental lowering of the saw blades is prevented by the air-operated rams with bias cross member 64, and hence the carriages, arbors and saw blades to their elevated positions.

While an embodiment of the invention has been illustrated herein, it is recognized that certain variations and modifications may become apparent to one skilled in the art, and may be made without departing from the spirit of the invention, and it is desired to cover all such variations and modifications which come within the scope of the appended claims.

It is claimed and desired to secure by Letters Patent:
1. Saw apparatus comprising
upright guide structure,
carriage structure movable up and down on said guide structure,
a pair of laterally spaced-apart parallel saw arbors mounted on said carriage structure, adapted to mount saw blades, with such saw blades in substantially a common vertical plane, and
support means adapted to support an elongated workpiece with such workpiece disposed parallel to said arbors and across the plane of such saw blades,
said arbors, on downward movement of said carriage structure, moving toward said support means and a workpiece supported thereby, with such movement being in a direction extending transversely of the axes of the arbors, and with the arbors moving toward laterally opposite sides of the workpiece.

2. The apparatus of claim 1, wherein said guide structure includes a pair of laterally spaced posts, and said carriage structure includes a pair of carriages with each mounted for movement on one of the posts, and which further comprises interconnecting structure extending between said carriages and rigidly interconnecting them for movement as a unit.

3. The apparatus of claim 2 which further comprises a biasing ram acting on said interconnecting structure biasing the interconnecting structure, carriages and arbors to a position spaced above said support means, and another ram operatively connected to said interconnecting structure actuatable to move the interconnecting structure, carriages and arbors downwardly against the bias exerted by said biasing ram.

4. The apparatus of claim 2 which further comprises an eccentric member rotatably mounting each arbor, the eccentric member being turnable for adjustment purposes about an axis parallel to and offset from the axis of the arbor mounted by the member.

5. The apparatus of claim 1, which further comprises power-operated means for rotating the saw arbors with the rotation of the arbors being in opposite directions.

6. The apparatus of claim 5, wherein saw blades are mounted on said arbors, with such blades, when viewed in the direction that the arbors are moved on vertical movement of the carriage structure, having overlapping peripheral edges.

7. The apparatus of claim 6, wherein one arbor is supported by the carriage structure below the other arbor.

8. The apparatus of claim 6, wherein said support means comprises an elongated conveyor for moving a workpiece in a direction paralleling said arbors and means for cradling the workpiece inhibiting lateral movement thereof.

9. The apparatus of claim 5, wherein said power-operated means comprises a motor for each saw arbor and said motors are mounted on said carriage.

References Cited
UNITED STATES PATENTS 1,645,924 10/1927 Palmigiano _____ 143—47
2,664,926 1/1954 Fuglie.

WILLIAM W. DYER, Jr., *Primary Examiner.*

W. D. BRAY, *Assistant Examiner.*